Sept. 6, 1966    D. M. BOYD, JR., ET AL    3,271,111
METHOD AND APPARATUS FOR BORON TRIHALIDE ANALYSIS
Filed Jan. 28, 1965
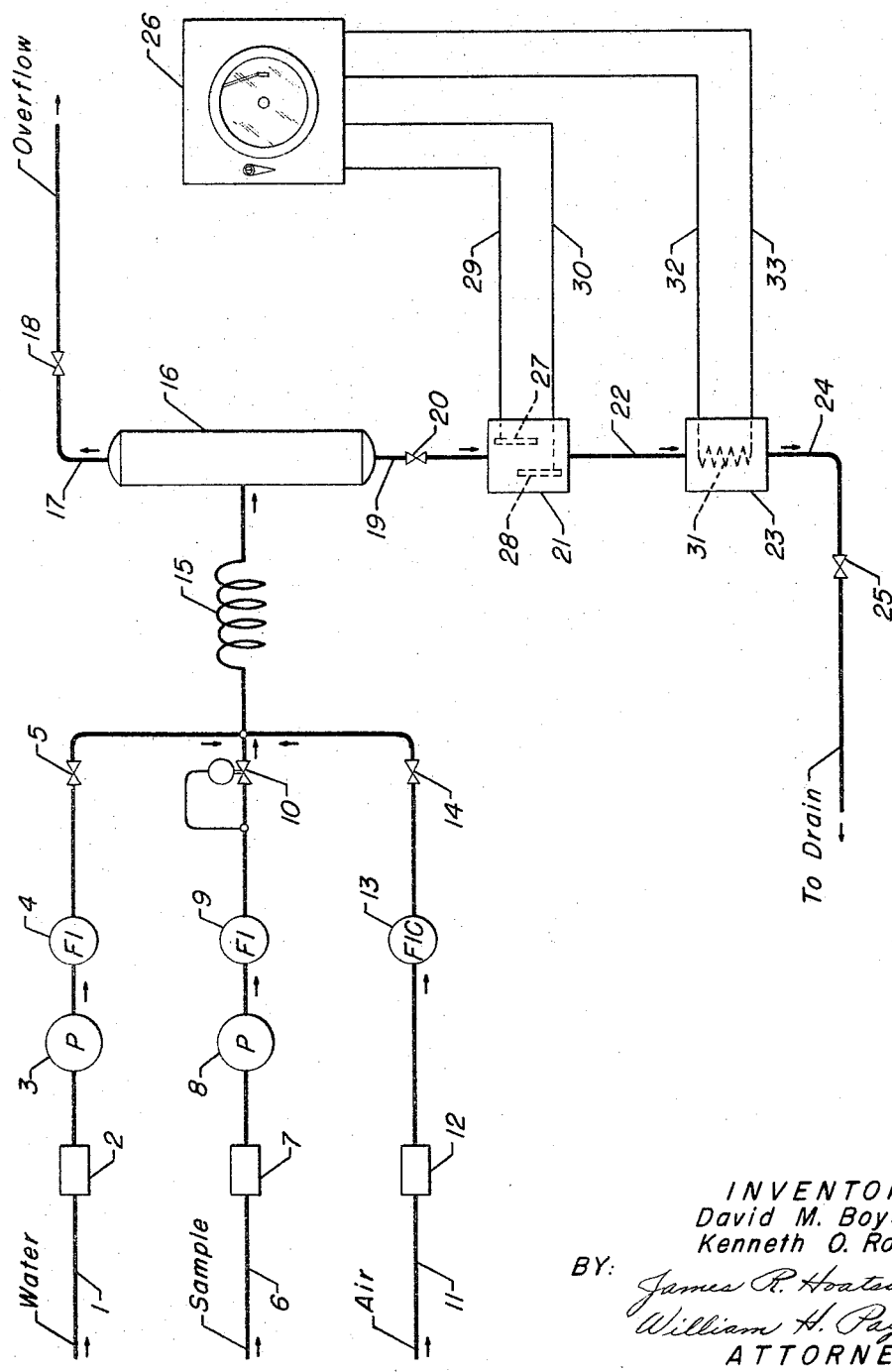
INVENTORS:
David M. Boyd Jr.
Kenneth O. Rockey
BY:
James R. Hoatson Jr
William H. Page II
ATTORNEYS

United States Patent Office 3,271,111
Patented Sept. 6, 1966

3,271,111
METHOD AND APPARATUS FOR BORON
TRIHALIDE ANALYSIS
David M. Boyd, Jr., Clarendon Hills, and Kenneth O. Rockey, Evanston, Ill., assignors to Universal Oil Products Company, Des Plaines, Ill., a corporation of Delaware
Filed Jan. 28, 1965, Ser. No. 428,767
7 Claims. (Cl. 23—230)

This application is a continuation-in-part of application Serial No. 125,825, filed July 21, 1961, now abandoned.

This invention relates to a method and apparatus for determining the concentration of a boron trihalide in a liquid hydrocarbon. More particularly, this invention is directed to a method and apparatus for the continuous measurement of the concentration of a boron trihalide, such as boron trifluoride, in a liquid hydrocarbon carrier utilizing an electrical conductance cell.

In commercial processes involving the $BF_3$-catalyzed alkylation of aromatics, it is often important for the plant operator to know the boron trifluoride concentration of the various flowing process streams. Such boron trifluoride concentration is commonly encountered in the range of 50–2000 p.p.m. According to previous practice, it was necessary to take periodic batch samples from the process streams of interest, usually two or three times a day, and conduct time-consuming laboratory tests on them requiring thirty minutes or more to carry out; during this prolonged interval, the process was running "blind" and it was possible for large upsets to occur before the necessary corrective action could be initiated by the plant operator.

The present invention provides a means for the automatic and continuous conductometric analysis for a boron trihalide dissolved in a liquid hydrocarbon process stream. In general, the response time of the analytical instrument of this invention is five minutes or less, thereby providing a much more rapid analysis and eliminating the above-mentioned problem of dead time. The hydrocarbon process streams to be analyzed generally have a boiling point or initial boiling point above 100° F.; for example, typical hydrocarbon carriers may comprise benzene, toluene, mixed xylenes, ethylbenzene, cumene and polynuclear aromatics, and the boron trihalide content thereof will range from about 50 to about 2000 weight p.p.m.

The instant technique is carried out by intimately mixing a sample stream of the boron halide-containing hydrocarbon with a stream of substantially pure water. During the mixing step the boron halide is absorbed in and hydrolyzed by the water to form an ionic solution. The water-hydrocarbon mixture is passed from the mixing zone to a gravity separation zone wherein the mixture is allowed to separate into a hydrocarbon phase and an aqueous phase. The aqueous phase is withdrawn from the gravity separation zone and passed through an electrical conductance cell, and the electrical conductivity thereof provide a measure of the boron trihalide content of the sample stream. In view of the fact that the volatility of the boron trihalide is very much greater than that of the hydrocarbon, the pressure of the sample stream between the sample withdrawal point and the mixing zone is maintained sufficiently high to insure that all constituents thereof remain in the liquid phase; if this precaution is not taken, the boron trihalide and light hydrocarbon may vaporize during passage of the sample from the withdrawal point to the analyzer, resulting in alternating slugs of liquid and gas and generating erroneous readings. The hydrocarbon sample is then flashed to a relatively low pressure e.g. approximately atmospheric pressure, to form a vapor-liquid mixture, the vapor being rich in boron trihalide in view of its high volatility. The resulting vapor-liquid mixture is then admixed with water in the mixing zone to extract boron trihalide from the vapor phase as well as the residual amounts remaining in the hydrocarbon phase. A further important feature of the invention to promote intimate mixing of the liquid and vapor phases with the water is to charge an aeration gas to the mixing zone concurrently with the water and flashed sample. One suitable aeration gas is air, although nitrogen, natural gas, normally gaseous hydrocarbons and other inert gases may be employed where desired.

In carrying out the continuous analysis, the measured conductivity of the aqueous phase is a unique function of the concentration of boron trihalide present in the sample as charged even though complete extraction of the boron trihalide should not be obtained. In most cases the calibration of the apparatus is inherently linear or can be made linear by varying the relative flow rates of water and sample, that is, a plot of extract phase conductivity versus concentration of boron trihalide yields a straight line of positive slope over the range of interest at constant temperature. However, even where substantial linearity cannot be obtained, the apparatus can be easily calibrated by the use of several reference samples of known composition.

One embodiment of the invention provides a method of continuously determining the concentration of a boron trihalide, such as boron trifluoride, in a flowing stream of liquid hydrocarbon containing such boron trihalide which comprises withdrawing from said flowing stream a sample stream of hydrocarbon; passing the sample stream, under a pressure sufficiently high to maintain all constituents of the sample stream in the liquid phase, to a pressure reducing means; reducing the pressure of the sample stream and partially flashing it to form a vapor-liquid mixture; commingling a stream of aeration gas, such as air, and a stream of substantially pure water with the resulting vapor-liquid mixture; intimately mixing such streams and dissolving in the water the boron trihalide present in the sample stream; passing the resultant gas-hydrocarbon-water mixture to a gravity separation zone and withdrawing therefrom a water-rich stream; passing the water-rich stream through an electrical conductance cell; and continuously measuring the electrical conductivity of the water-rich stream as a measure of the boron trihalide content of the sample stream.

Another embodiment of the invention is directed to a boron halide analyzer comprising an elongated mixing tube; means for separately charging a sample stream, a water stream and an aeration gas stream to one end of the mixing tube; pressure reducing means for reducing the pressure of a sample stream immediately upstream from said one end of the mixing tube; a separating chamber in fluid communication with the other end of the mixing tube; means for withdrawing overflow and underflow respectively from the upper and lower portions of the separating chamber; a pair of spaced electrodes in fluid communication with the lower portion of the separating chamber; and resistance-measuring means electrically connected to the electrodes.

The structure of the apparatus and method of operation of this invention may best be described with reference to the accompanying drawing which is a schematic flow diagram of a boron halide analyzer embodying the principles of this invention. It is intended that the drawings are for the purpose of illustrating and not limiting the invention to the particular apparatus therein set forth and that all equivalent structures will come within its broad scope.

With reference now to the drawing, a water inlet line 1 is connected through filter 2, metering pump 3, flow indicator 4, and needle valve 5, to a tubular mixing spiral 15. A sample inlet line 6 is connected through filter 7, metering pump 8, flow indicator 9, and back pressure regulator 10 to spiral 15. An air inlet line 11 is connected through filter 12, flow indicating controller 13 and needle valve 14 to spiral 15. The other end of mixing spiral 15 is connected to a separating chamber 16. An overflow withdrawal line 17 is connected to the upper portion of chamber 16 and an underflow withdrawal line 19 connects the lower portion of chamber 16 through valve 20 to a through-flow conductance cell 21. A suitable conductance cell for this service is model No. CEL–AO1 manufactured by Industrial Instruments, Inc.; other types of cells are equally satisfactory. The outlet port of conductance cell 21 is connected via line 22 to a temperature-compensating cell 23. Liquid is discharged from cell 23 through line 24 and valve 25 to a drain or other suitable disposal facility. Electrical conductivity is continuously recorded by recorder 26. One suitable conductivity recorder is model 9460–DA manufactured by The Foxboro Company, which employs a modified self-balancing A.C. Wheatstone bridge operating at a frequency of 1000 c.p.s. Conductance cell 21 contains a pair of spaced, platinum blacked electrodes 27 and 28 which are electrically connected to recorder 26 via wires 29 and 30, respectively, so that cell 21 forms one arm of the measuring bridge. Temperature-compensating cell 23 contains a thermistor 31, or resistor having a negative coefficient of resistance with respect to temperature, which is electrically connected to recorder 26 via wires 32 and 33. Cell 23 forms another arm of the bridge. The remainder of the circuitry is contained within the recorder, and being commercially available and well known to those skilled in the art requires no further discussion here.

Regarding the operation of the apparatus, a sample of hydrocarbon such as ethylbenzene containing small quantities of $BF_3$ is withdrawn from a flowing process stream and is charged at a controlled rate, as set by metering pump 8, through line 6 to back-pressure regulator 10. Regulator 10 holds the upstream pressure high enough to prevent $BF_3$ and light hydrocarbon volatilization with resultant sample composition change. For a typical sample temperature of 80°–110° F. and $BF_3$ concentrations of 50–2000 p.p.m., such pressure may range from 2 to 30 atmospheres. The sample pressure is reduced across regulator 10 to about atmospheric pressure, resulting in substantial vaporization of $BF_3$ and light hydrocarbons at a point immediately upstream from the mixing spiral. A stream of water is pumped from a suitable reservoir (not shown) at a controlled rate as set by metering pump 3 to mixing spiral 15. Mixing spiral 15 is a spirally wound length of small diameter tubing, e.g., ¼ inch–½ inch O.D., which provides a cocurrent mixing zone wherein the water and partly vaporized sample are thoroughly contacted. Merely to charge water and sample alone to spiral 15 will not achieve intimate mixing because the immiscible liquid phases will be transported through the spiral in the form of alternating slugs of water and hydrocarbon, the only mass transfer between the phases occurring at a plurality of very small circular interfaces. It is therefore an important feature of this invention to promote intimate mixing of the liquid phases by charging an aeration gas to the mixing zone concurrently with the water and hydrocarbon. Such aeration gas is provided by a stream of air charged through line 11 at a controlled rate of flow as set by flow indicating controller 13; other suitable aeration media are nitrogen, hydrogen, water gas, or gaseous hydrocarbons. Substantially all of the boron trifluoride present in the original hydrocarbon sample is hydrolyzed in the water phase to form an ionic solution; by providing a suitably long contact time, an extraction efficiency of about 99.5% can be obtained and substantially all of the boron trifluoride can be so hydrolyzed. The resulting air-hydrocarbon-water mixture, which is now in the form of a highly dispersed, frothy, heterogeneous mixture, is discharged from the mixing zone to separating chamber 16 wherein gravity separation of the phases is accomplished. The air, hydrocarbon and a small amount of water is taken overhead through line 17. A water-rich phase containing hydrolyzed boron trifluoride is removed from the bottom of separating chamber 16 through line 19. Valves 18 and 20 are adjusted to hold the hydrocarbon-water interface within chamber 16 at a constant level. The water-rich phase is passed through conductance cell 21 and thence through temperature-compensating cell 23; if desired, the temperature-compensating cell may be installed upstream from the conductance cell. Since the electrical conductivity of a solution increases with temperature, it is necessary either to control solution temperature or to compensate for it. Thermistor 31, which is connected in a parallel arm of the resistance-measuring bridge, is designed to give an increase in conductivity equal to that resulting from an increase in solution temperature, and conversely, the measuring bridge will not therefore be unbalanced by temperature changes alone and any unbalance which does occur may be ascribed uniquely to a change in boron trifluoride concentration in the hydrocarbon carrier. Other methods of temperature compensation will be discussed hereinbelow.

As a specific example of operating conditions, hydrocarbon sample is charged at a flow rate of 6 cc. per minute, water is charged at a flow rate of 20 cc. per minute, and air is charged at a flow rate of 3200 standard cc. per minute. Recorder 26 is provided with two standard ranges, 0–1000 p.p.m. $BF_3$ and 0–3000 p.p.m. $BF_3$, which ranges may be changed by switching different resistors into the measuring bridge circuit of the recorder. The pen position of recorder 26 is directly proportional to $BF_3$ concentration in the hydrocarbon sample and is insensitive to temperature changes within the range of 70°–120° F. Response time of the apparatus is about 5 minutes; that is, about 5 minutes is required for a step change in $BF_3$ concentration in hydrocarbon charged to line 6 to be faithfully reproduced by recorder 26.

A potential source of drift error may arise from a varying concentration of impurities in the water since it it neither practical nor possible to supply water which is absolutely free of dissolved impurities. The drift error may be eliminated by connecting to line 1 a reservoir or tank containing a fixed volume of thoroughly mixed, ordinary distilled water in sufficient quantity to assure a continuous analyzing time of several weeks. Of course, if the flow rate of the water or sample stream should be changed appreciably then the system must be recalibrated, e.g., a new scale factor provided. Very large range changes are easily accomplished simply by varying the water:hydrocarbon ratio or by changing a resistor in the measuring bridge.

The method of this invention may be implemented by means of other types of apparatus. For example, a paddle mixer may be substituted for mixing spiral 15; or the mixing spiral and separating chamber 16 may be replaced with a countercurrent extraction column which may be either a decked column or a packed column; or the mixing spiral and separating chamber may be replaced with a film-type turbocontacter. It will be obvious to those skilled in the art that recorder 26 may be replaced with a manually operated bridge circuit, or with a suitable automatic indicator, or the automatic resistance-measuring means may be employed in conjunction with a suitable control mechanism which actuates a final control element in the alkylation process itself whereby to control the boron trifluoride concentration at a desired point in the process. It is possible also to combine gravity separating chamber 16 with conductance cell 21, that is, conductance cell 21 is made to perform the function of phase separation; in this case, care must be taken to insure that the spaced electrodes 27 and 28 are fully immersed in the water-rich phase since serious measuring error would be introduced if the electrodes were partly or wholly covered with hydrocarbon. This in turn requires a rather high degree of precision in controlling the level of liquid-liquid interface. For this reason a separate gravity separation zone is preferred.

The method of temperature compensation hereinbefore discussed is sometimes known as parallel compensation since a resistive element having a negative coefficient of resistance is placed in a parallel arm of the bridge. A second method of temperature compensation which may be employed is series compensation whereby a conventional resistor, having a positive coefficient of resistance with respect to temperature whose magnitude is eual to the negative coefficient characteristic of the ionic solution to be analyzed, is connected in series with the conductance cell so that a change in solution resistance due to temperature is offset by an equal change of opposite sign in compensator resistance. A third method of temperature compensation which also eliminates errors caused by fluctuating impurity level in the water is to connect a second conductance cell in serial fluid communication with line 1 and to place it in close heat exchange relationship with the other fluid-conducting parts of the apparatus, as by immersing conduits 1, 6 and 11, mixing tube 15, separating chamber 16 and both cells in a liquid bath. This second cell is then electrically connected to recorder 26 by means of wires 32 and 33, temperature compensating cell 23 now being dispensed with, so that it forms a parallel arm of the measuring bridge. A change in either system temperature or water impurity concentration will affect both sides of the bridge equally and will not therefore unbalance it. A fourth method of eliminating temperature effects, somewhat cumbersome and involving a rather complex assemblage of apparatus, is simply to immerse the entire apparatus in a constant temperature bath and to provide means for controlling said temperature at a predetermined level.

We claim as our invention:

1. A method for continuously determining the concentration of a boron trihalide in a flowing stream of liquid hydrocarbon containing said boron trihalide which comprises withdrawing from said flowing stream a sample stream of said hydrocarbon; passing said sample stream, under a pressure sufficiently high to maintain all constituents of the sample stream in the liquid phase, to a pressure reducing means; reducing the pressure of the sample stream and partially vaporizing it to form a vapor-liquid mixture; commingling a stream of aeration gas and a stream of substantially pure water with said vapor-liquid mixture; intimately mixing said streams and dissolving in the water the boron trihalide present in said sample stream; passing the resultant gas-hydrocarbon-water mixture to a separation zone and withdrawing therefrom a water-rich stream; passing said water-rich stream through an electrical conductance cell; and continuously measuring the electrical conductivity of said water-rich stream as a measure of the boron trihalide content of said sample stream.

2. The method of claim 1 further characterized in that said boron trihalide is boron trifluoride.

3. The method of claim 1 further characterized in that said aeration gas is air.

4. The method of claim 1 further characterized in that the reduced pressure of said sample stream is approximately atmospheric pressure.

5. A boron halide analyzer comprising an elongated mixing tube; means for separately charging a sample stream, a water stream and an aeration gas stream to one end of said mixing tube; pressure reducing means for reducing the pressure of said sample stream immediately upstream from said one end; a separating chamber in fluid communication with the other end of said mixing tube; means for withdrawing overflow and underflow respectively from the upper and lower portions of said separating chamber; a pair of spaced electrodes in fluid communication with the lower portion of said separating chamber; and resistance-measuring means electrically connected to said electrodes.

6. A boron halide analyzer comprising an elongated spiral mixing tube; a sample inlet conduit, a solvent inlet conduit, and an aeration gas conduit, each connected to one end of said mixing tube, said sample inlet conduit further including a pressure reducing means for reducing the pressure of the fluid sample charged therethrough; a separating chamber connected to the other end of said mixing tube; an overflow conduit connected to the upper portion of said separating chamber; a through-flow electrical conductivity cell connected to the lower portion of said separating chamber; and resistance-measuring means electrically connected to said conductivity cell.

7. The analyzer of claim 6 further characterized in the provision of temperature-compensating means in fluid communication with the lower portion of said separating chamber and electrically connected to said resistance-measuring means.

References Cited by the Examiner
UNITED STATES PATENTS

| | | | |
|---|---|---|---|
| 2,158,525 | 5/1939 | Reidl et al. | 23—207 |
| 2,520,391 | 8/1950 | Findlay | 23—310 |
| 2,580,010 | 12/1951 | Fenske et al. | 196—14.49 |
| 2,710,250 | 6/1955 | Andrews et al. | 23—267 |
| 2,902,639 | 9/1959 | Thayer et al. | 324—30 |
| 2,905,536 | 9/1959 | Emmett et al. | 23—232 |
| 2,967,764 | 1/1961 | Skeggs | 23—253 |
| 3,114,609 | 12/1963 | Jones | 23—230 |
| 3,118,735 | 1/1964 | Favre et al. | 23—230 |

FOREIGN PATENTS 797,752   6/1958   Great Britain.

OTHER REFERENCES

Blair, "Anal. Chem.," vol. 10, pp. 207–209 (1938).

MORRIS O. WOLK, *Primary Examiner.*
Z. PAROCZAY, *Assistant Examiner.*